(12) United States Patent
Hadari et al.

(10) Patent No.: US 10,209,719 B2
(45) Date of Patent: Feb. 19, 2019

(54) INTERACTIVE POOL CLEANING ROBOT

(71) Applicants: Yair Hadari, Kibbutz Hulata (IL); Shay Witelson, Kibbutz Yizrael (IL)

(72) Inventors: Yair Hadari, Kibbutz Hulata (IL); Shay Witelson, Kibbutz Yizrael (IL)

(73) Assignee: MAYTRONICS LTD., Kibutz Yizrael (IL)

( * ) Notice: Subject to any disclaimer, the term of this patent is extended or adjusted under 35 U.S.C. 154(b) by 7 days.

(21) Appl. No.: 15/415,892

(22) Filed: Jan. 26, 2017

(65) Prior Publication Data

US 2017/0212523 A1    Jul. 27, 2017

Related U.S. Application Data

(60) Provisional application No. 62/287,006, filed on Jan. 26, 2016.

(51) Int. Cl.
*G05D 1/02* (2006.01)
*E04H 4/16* (2006.01)
*G05D 1/00* (2006.01)

(52) U.S. Cl.
CPC .......... *G05D 1/0274* (2013.01); *E04H 4/1654* (2013.01); *G05D 1/005* (2013.01); *G05D 1/0016* (2013.01); *G05D 2201/0203* (2013.01)

(58) Field of Classification Search
CPC .... G05D 1/0274; G05D 1/0016; G05D 1/005; E04H 4/1654
See application file for complete search history.

(56) References Cited

U.S. PATENT DOCUMENTS

| | | | |
|---|---|---|---|
| 5,569,371 A | 10/1996 | Perling | |
| 2014/0015959 A1 | 1/2014 | Durvasula | |
| 2014/0222279 A1* | 8/2014 | Stout | G05D 1/0219 701/25 |
| 2014/0259464 A1 | 9/2014 | Renaud | |
| 2014/0303810 A1 | 10/2014 | Van Der Maijden | |

FOREIGN PATENT DOCUMENTS

| EP | 0389459 | 9/1990 |
|---|---|---|
| EP | 2908205 | 8/2015 |

* cited by examiner

*Primary Examiner* — Basil T. Jos
(74) *Attorney, Agent, or Firm* — Reches Patents

(57) ABSTRACT

A pool cleaning robot, a mobile computer, and a method for operating a pool cleaning robot, the method may include receiving, by the pool cleaning robot, demarcation information that defines pool zones and pool cleaning robot operational parameters related to the pool zones; wherein the demarcation information is generated by a mobile computer and under a control of a user; and performing a cleaning operation, by the pool cleaning robot, based on the demarcation information.

32 Claims, 11 Drawing Sheets

INTERACTIVE POOL CLEANING ROBOT

CROSS REFERENCE

This application claims priority from U.S. provisional patent Ser. No. 62/287,006 filing date Jan. 26 2016 which is incorporated herein by reference.

BACKGROUND

It is well known that pool cleaning robots are usually being immersed into a swimming pool and their operation initiated. After that, the movement and scanning of the pool cleaning robots are governed by various navigation options.

There is a growing need to reduce the human intervention and improve the efficiency of pool cleaning robots in swimming pools by optimizing their scanning and cleaning performances.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
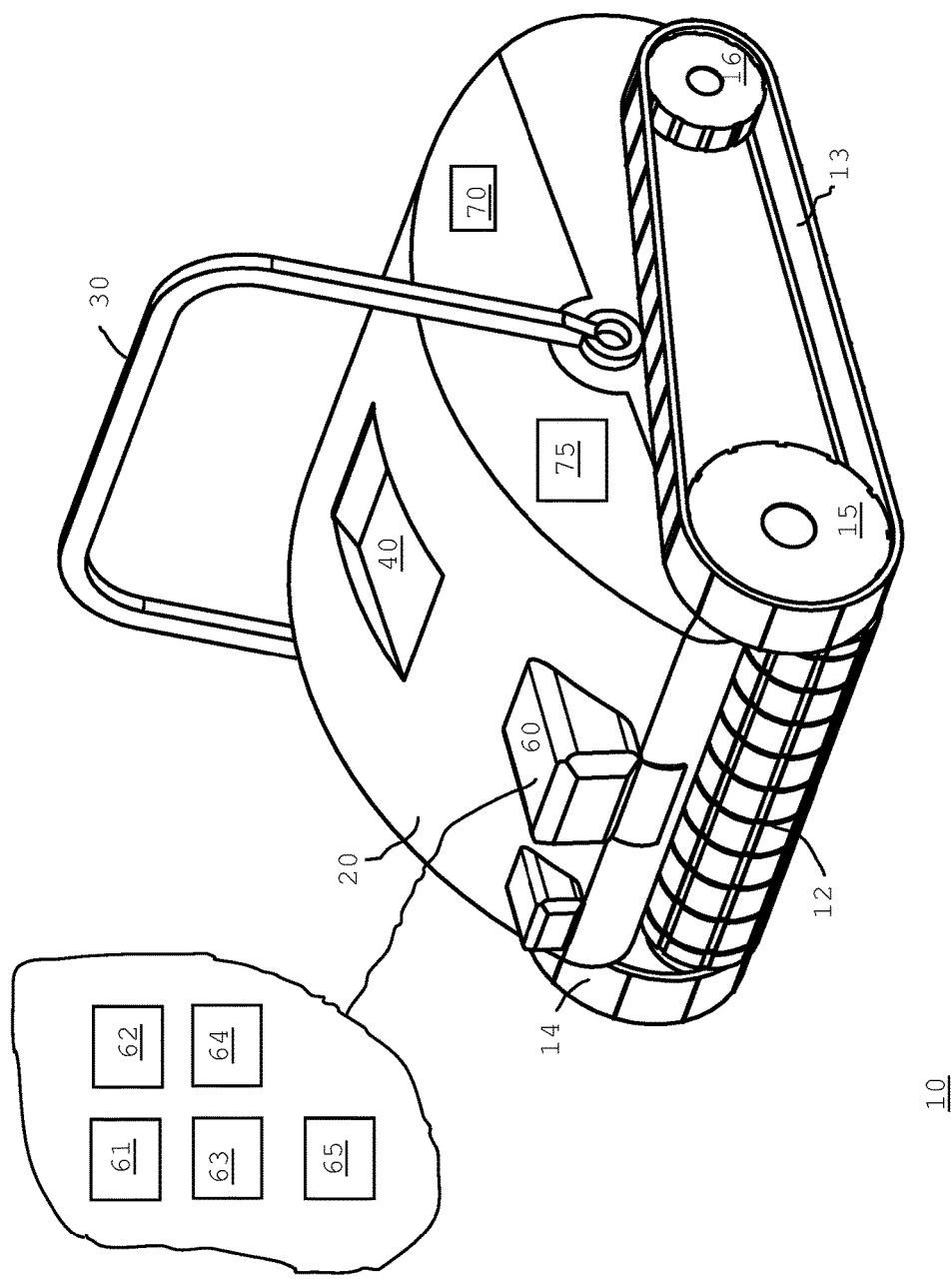
FIG. 1 illustrates a pool cleaning robot, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the Summary of the invention of the specification.

The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

The term "and/or" is additionally or alternatively.

The terms "control unit", "remote control device", "control device" and "mobile computer" are used in an interchangeable manner.

Any reference in the specification to a pool cleaning robot should be applied mutatis mutandis to a method that can be executed by the pool cleaning robot and to a computer readable medium that stores instructions to be executed by the pool cleaning robot.

Any reference in the specification to a mobile computer should be applied mutatis mutandis to a method that can be executed by the mobile computer and to a computer readable medium that stores instructions to be executed by the mobile computer.

Any reference in the specification to method should be applied mutatis mutandis to a pool cleaning robot and/or to a mobile computer that execute the method and/or to a computer readable medium that stores instructions that once executed result in an execution of the method.

Any reference in the specification to a non-transitory computer readable medium should be applied mutatis mutandis to a pool cleaning robot and/or a mobile computer capable of executing the instructions stored in the non-transitory computer readable medium and should be applied mutatis mutandis to method that may be executed by a pool cleaning robot and/or a mobile computer that reads the instructions stored in the non-transitory computer readable medium.

Because the illustrated embodiments of the present invention may for the most part, be implemented using electronic components, touch screens and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Navigation options may usually include random movements where the robot climbs walls, moves back and forth without any preplanned or preprogrammed routing. Said navigation options may be pre-programmed whereby the pool cleaner travelling path or paths include the entire non-demarcated surface of the pool, floor and walls. Any travelling movement may be prone to encountering obstacles without the ability to respond in an effective manner if the robot is stuck. For example, if it has climbed a wall breached the waterline and sucked air inside so that the robot is now uselessly floating on the water surface. Inability to release the robot from an obstacle is both time consuming on account of ineffective pool cleaning and it may also cause irreparable damage to a pool cleaning robot.

More advanced robots may carry means to enable the robot to identify obstacles or pool walls. For example, such means may be mechanical impact sensors that may identify a meeting with a wall that will automatically implement an escape program. This may be translated into a stop forward trajectory and a reversal of forward movement.

Sensors may increase in sophistication. For example, inertial motion sensors may be used in conjunction with embedded control algorithms. Different responses to different encountering with obstacles may be initiated. An impact meeting with a wall may be recognized by means of an impact sensor such as an accelerometer device.

At the higher end of programmed pool cleaning robots, navigation makes use of cameras, infrared cameras, video cameras, laser beams, acoustic transducers, compasses, gyroscopes and gyrocompasses, turbidity sensors, dirt identification sensors and more.

A combination of less sophisticated to some very advanced sensors, probes and communication means may be employed in a robotic pool cleaning robot.

Pre-programming of responses to obstacles meeting events and pre-planned trajectories may be accomplished by software programs that are factory embedded onto microprocessors onboard the pool cleaning robot control box to become part of the pool cleaner operational framework.

The multi level and multi faceted sensor on board devices form a multi level pool elements constituents identification means in the wide sense. In other words, if one sensor is not sufficient or is disabled then another sensor may function as a backup to fill the data void for optimal scanning in the pool. The more disabled sensors there are the more the cleaner will shift from a fully controlled scanning into an incrementally random characterized scanning of the pool.

Some sensors, especially optical sensors are more sensitive to environmental factors such as lack of lighting, or milky waters. Other sensors, maybe second tier sensors, such as inertia sensors, are less sensitive and may continue to operate under adverse conditions.

For another example, a turbidity sensor may command an on-board navigation optical sensing means or a camera to shutoff due to confirmed and verified poor visibility due to high water turbidity condition. Navigation may then place emphasis on proceeding the scanning by means of a second tier sensor system.

Additional pool cleaner sensors and probes analyze the chemistry of the pool water. Any deterioration may have adverse effect on the scanning of and movement of a pool cleaner. For example: lack of chlorine may cause algae growth that causes slippery scanning paths.

This invention also envisages that any deterioration from a fully controlled scanning condition to a random movement scanning will automatically emit a wireless, or other electrical status signal, such as a flashing light, to alert the pool owner or pool cleaner operator about said adverse conditions.

Additional programs may be made available to the end user where he or she may manually choose certain parameters. Therefore, pool cleaning robots may be governed by a remote control communication device. Such devices may be used to override pre-programmed automatic navigation trajectories or obstacle avoidance procedures for manual directional updated control of the pool cleaning robot in the pool, or alternatively for the selection of other automatic scanning or updated cleaning programs Such remote control devices may also contain menus with a variety of additional parameters to choose from. For example, pre-scheduled operation times, special cleaning modes, cleaning cycle times, length and/or width of pool, form of pool, timer settings, speeds of movement and more. Importantly, demarcation of an area/zone or areas/zones or travelling paths may be defined and focalized.

In this specification, demarcation is a term related to any specific inclusion or exclusion of a place within the pool where the pool cleaner should travel or not travel on, to be or not to be in said place whether it is a travelling path or a specifically defined area. This includes pool walls demarcations areas or walls cleaning paths. It should be noted that widths of pool cleaner may vary in size between a few tenths of centimeters to a meter or more. A specific demarcated path or area may therefore be commensurate to the type and sizes of the pool cleaner.

With increased technological advancement, computers, smart phones, pads or tablets may employ updating program applications that operate in lieu of factory-supplied remote control units. Furthermore, such advancements allow for two-way wireless or partially—wireless communications between the pool cleaning robot and the pool owner.

The computer and telephony industries also offer a variety of graphical interfaces that allow users to interactively send commands to pool cleaning robots specifically or to any electronically controlled devices that may possess the ability for such communications.

By communicating with pool cleaning robots, users may engage these interfaces by means of adding or drawing or swiping on a touch screen such elements as the contour shape of the pool, major pool features or obstacles such as for example: a main drain, necessary movement paths and virtual scanning trajectories in a pool, the virtual cleaning demarcation zones or the virtual non-cleaning demarcation zones or areas or paths, drawing and setting obstacles locations and more.

Such graphical interface applications may primarily be pre-programmed by the pool cleaning robot manufacturer to be factory fitted onto OEM control devices or downloaded onto computer or telephony devices.

Pool shape and pool obstacles are by default endeavored to be identified and recorded autonomously by the pool cleaner sensors and main control logic.

Any commands or data inputs to the pool cleaning robot on-board processing means arriving from external devices transmitting graphical interfaces may then be verified and memorized by the on-board sensors and computerized control means that together form the overall pool navigation, scanning and obstacle management system.

It is clear that the said communication interactivity may function as an additional overriding updating program when the end user wishes to take over control of the pool cleaning robot interactively by imposing new overriding virtual trajectories or commands during a cleaning cycle. The interactive new set of commands may provide an end user with a method to independently improvise and impose new, updated pool cleaning programs or features that are not comprised in the default factory supplied OEM program or when the OEM program is facing a difficulty and cannot, for example, scan the pool according to plan due to some unforeseen obstacle or adverse pool conditions such as water chemical imbalance, slippery surfaces due to algae and the like.

The present invention may also provide the end user or operator with a pool-cleaning robot with novel tools to interact with its pool-cleaning robot that, besides providing technical solutions may also add fun features for the user or family members including the young.

There is provided a self propelled pool cleaner that, for navigational purposes when submerged in pool water, employs sensors and on-board pre-programmed computer for determining the underwater surroundings or constituents data of a swimming pool that assists the scanning and cleaning operational frameworks parameters of the entire pool surfaces; and is able to interactively transmit and receive visual illustrations and data, respectively, to and from said pool cleaner operator that remotely controls the pool cleaner using a portable computerized processing device comprising a touch screen; characterized by the ability of the pool operator, to modify said received pool surroundings' or pool constituents' data; and re-program and update default control parameters commands using off the screen menu selected iconographies and graphical illustrations; and touch screen drawing swipe gestures; and transmitting said cleaning program modifications to the pool cleaner in order to re-program and update the said pool cleaner computer; and embed new operational frameworks in the pool cleaner computer; whereby said new operational frameworks include the tenure within or exclusion from said virtual demarcation areas within the pool.

The said pool cleaner is further characterized by the ability of the pool operator to modify said received pool surroundings' or constituents' data and default program parameters control parameters and operational frameworks using off the screen menu selected iconographies and graphical illustrations and transmitting said program modifications to the pool cleaner in order to re-program the said pool cleaner computer; and embed new operational frameworks in the pool cleaner computer memory; whereby said new operational frameworks modifications include using or employing touch screen drawing swipe gestures; whereby the drawing may comprise freehand drawn virtual cleaning paths and trajectories or stored default scanning paths; to be adopted by the pool cleaning robot after the new data is transmitted to the pool cleaner control logic for navigational purposes when submerged in pool water.

The said pool cleaner is further characterized by the ability of the pool operator to draw a 'home' point on the screen representing the pool diagram whereby this said point will represent a programming of the end of cycle point, where the pool cleaner will terminate its cleaning cycle.

The pool cleaning robot may comprise one of the following elements on-board:

a. A hollow body,
b. A water intake aperture,
c. A water outlet aperture,
d. A hydraulic path stretching between the said intake and outlet,
e. A filtering and/or sieving element positioned inside the said hydraulic path,
f. At least one pumping motor positioned in the hydraulic path,
g. At least one driving motor and set of reduction gears,
h. Travelling wheels,
i. Wheels connecting shafts,
j. Pool surface dirt brushes or scrappers,
k. Auxiliary brushing or scrapping member,
l. Tracks,
m. Electrical tethered power supply cable,
n. A chargeable battery,
o. An electrical power supply pack (external to the pool),
p. A communication unit for communicating (wirelessly or in a wired manner or both) with a computerized control unit.
q. An on board day and/or night camera, video or optical sensor
r. A video device that captures, memorizes locations of pool features or obstacles and calculates the relative angle and distance of the robot from these features to further calculate the robot location in the pool
s. A lighting optical recognition aid device for nighttime and/or for high turbidity conditions that may also employ an infrared light device.
t. One or more additional motion sensors such as an accelerometer and/or a gyroscope and/or an inertial measurement unit (IMU).
u. A turbidity sensor.
v. A heading direction measurement sensor such as magnetometer, compass and/or a gyrocompass
w. Impact sensors and/or pressure sensors
x. Pump motor velocity/current sensors
y. Filter status sensors The pool cleaning robot may communicate with a control device such as a portable computer or tablet or smart telephone device including a suitable IOS, Android or Windows phone operating systems with internet and/or wireless communication abilities, each including, but not exclusively, a touch screen or the like, able to accept interactive swiping or graphical drawing by means of, for example, a finger gesture or a suitable pen device and further comprising a suitable application enabling toolbar menus for painting or drawing on the said screen by means of an application procedure that will convert the final drawing or commands to electronic digitized signals The control device may execute a program, code and the like that will cause the control device to display a drawing application menu comprising toolbar elements such as: pool form templates, different pool features or elements such as obstacles, different shapes and lines, freehand lines brush tip, eraser tip etc.

The control device will provide the end user or operator with the manual overriding ability over a OEM preprogramming to reprogram the pool cleaning robot by loading the electronic digitized drawing of the pool into the main on-board computer of the pool cleaning robot to be processed and converted—in conjunction of the said sensors—into a navigational scanning and obstacle avoidance travelling cycle.

The control device will provide the user with the ability to interactively draw a virtual cleaning path onto the touch screen and program the pool cleaning robot accordingly.

The pool cleaning robot may propagate along a path (determined and demarcated by the user or not determined by the user) perform pool feature/obstacle recognitions and send the control device information that will enable the control device to present to the user graphical schematics of the contour of the pool, the shallow and deep ends, main drain, walls, steps, ladders, swim counter current jets, pop up cleaning jets, paths traversed or areas already cleaned by the pool cleaning robot, show clock with real time left to end of cleaning cycle according to fulfillment of the programmed task, full filter announcement icon, sound toolbars, pool cleaning robot serial number and other general status and technical messages such relating to cleaner and the like.

Importantly, a main feature of this invention is that the control device will enable the user or operator to add features on the touch screen and draw virtual scanning demarcation lines or paths for cleaning zones or paths in the pool, mark special pool areas that may need focalized special attention by demarcating at least one area or zone or a demarcated travelling path, mark 'home' end-point to arrive to at the end of the cleaning cycle, ability to overrule the preset cycle time and the like.

Said virtual demarcation areas or zones in the pool may comprise of choice commands that may mean not to enter into the demarcated zone. Namely, command to avoid cleaning in said zone or alternatively, spend the focalized scanning and cleaning time within that demarcated zone only.

By default, the control device can benefit from information acquired by the pool cleaning robot and optionally from information acquired elsewhere to generate a three dimensional graphic representation (or any other type of representation) of the pool. As per above, additional ability of the pool cleaning robot to scan, memorize, draw and present to the end user by depicting the above schematics also in a 3D drawing format of the pool that may be rotated or panned.

Using the control device and the communication between the control device and the pool cleaning robot the user may control the operation of the on-board camera or video interactively to take underwater photos or video films to be stored on the smart device or computer.

The pool cleaning robot may be equipped with interactive platform speakers or add on speakers that can be fed (under the control of the user and/or without intervention of the user) to provide different sounds, such as:
a. "Eating" or intake sounds of debris, leaves, and dirt
b. Cleaning and scrubbing sounds at the water line
c. Camera shutter or rolling sounds for photo takings or filming
d. Special sounds for full filter indication
e. Special sound to accompany scanning or for cleaning completion
f. Sound for bumping at walls or obstacles
g. Use dolphins or whales sounds and the like whenever suitable Additionally or alternatively said sounds and/or other sounds may also be generated by the control device and/or other internal or external speakers. The speakers may all be controlled by the control device.

The generation of sounds may be accompanied by a vibration feature to enhance pool cleaning robot scanning experience (for example: vibrate the control device when the pool cleaning robot bumps against a wall).

Sounds such as music played on the control device may activate and control a laser light show on the pool surfaces including laser pulsations from the pool cleaning robot according to music rhythm. Different forms/colors/vibrations or pulsations/twirls or swirls/pre-programmed rhythms may be connected to external music for laser display/ increase—decrease rate of laser pulsations light show.

The control device may comprise an overriding voice activated commands facility.

The pool-cleaning robot may include an optional intruder sensor on the pool-cleaning robot to be automatically activated, for example, for nighttime pool cleaning cycles or when the users or bathers are away. Each time a human or a pet enters the pool without authorization the pool cleaning robot may shut itself off and/or send a wireless message to the a computer systems or phone device equipped with a suitable application that may advise or alert the pool owner of the said intrusion event. The alert may come in any of the usual forms available or on offer in the application.

DESCRIPTION OF THE DRAWINGS

FIG. 1 illustrates a pool cleaning robot, according to an embodiment of the invention. Pool cleaning robot 10 includes brush wheel 12, tracks 13 and 14, front wheel 15, rear wheel 16, housing 20, outlet 40 for outputting fluid, inlet (not shown) for receiving fluids, handle 30, controller 70, communication unit 75 that may include a receiver and a transmitter, and sensor compartment 60 that may host one or more sensors such as but not limited to gyroscope 61, turbidity sensor 62, accelerometer 63, camera 64. An entertainment LED light/laser source compartment 65 that may be combined with sensor compartment 60 or may be included in a separate compartment. Any combination of sensors may be included in the pool cleaning robot 10. Any sensor or light source may be located in any position on or within the pool cleaning robot 10.

The pool cleaning robot may include any type of propulsion system, any type of filtering unit, and the like. The propulsion system is represented in FIG. 1 by tracks 13 and 14 and wheels 15 and 16 but may include other elements such as but not limited to a drive motor and a gear.

Figure 2:
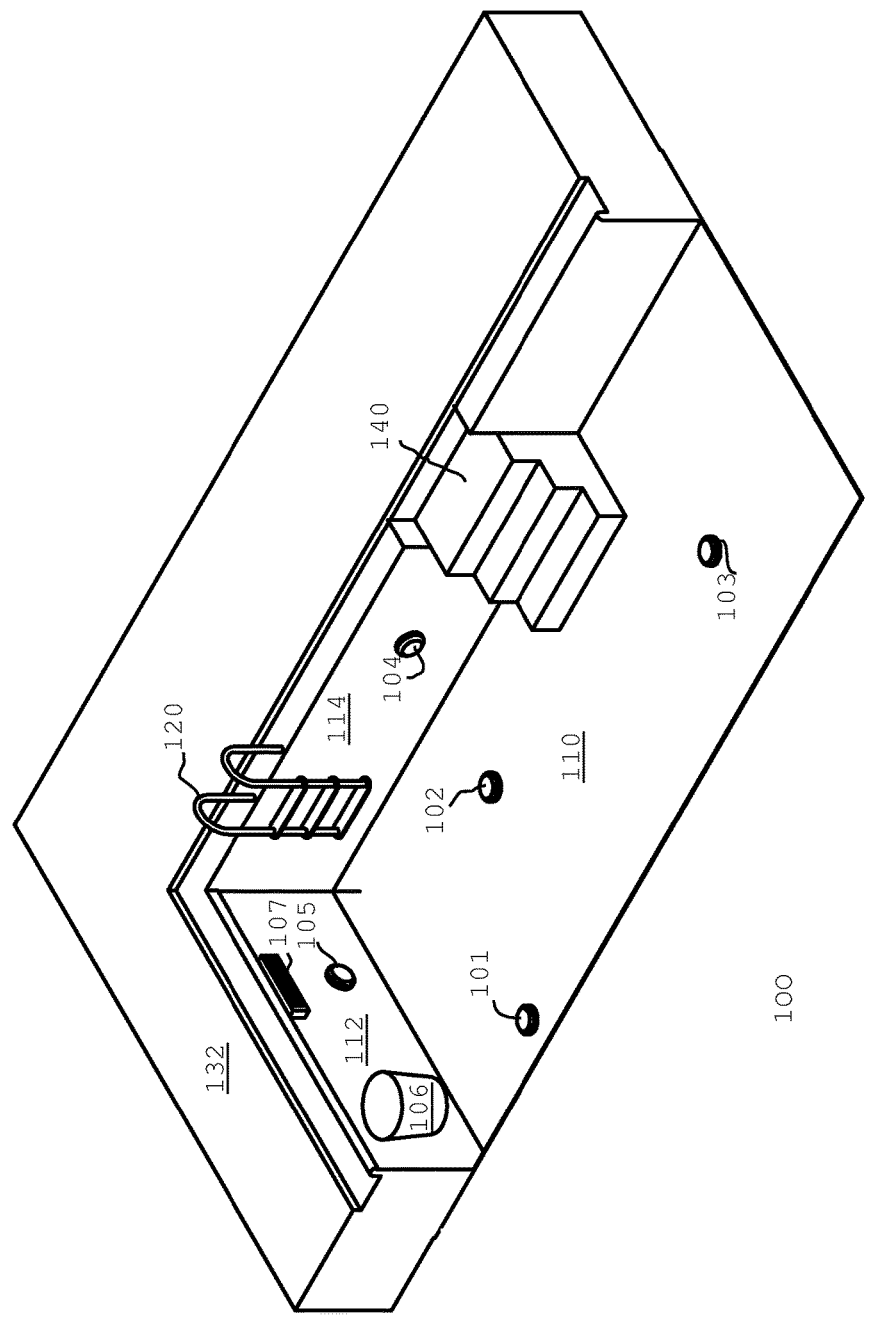
FIG. 2 illustrates a pool depicting various obstacles to pool cleaner performances.

FIG. 2 illustrates a part of pool 100. The pool has bottom 110, sidewalls 112 and 114 as well as two other sidewalls that are not shown. Pool 100 includes various obstacles such as main drain/drains or floor cleaning jets 101, 102 and 103, stairs 140, ladder 120, skimmer 106 and 107, pool jet 104, pool lighting element 105. The pool is surrounded by an overflow drain 131 and an external surface or pool deck 132. This is just a non-limiting example of a pool.

Figure 3:
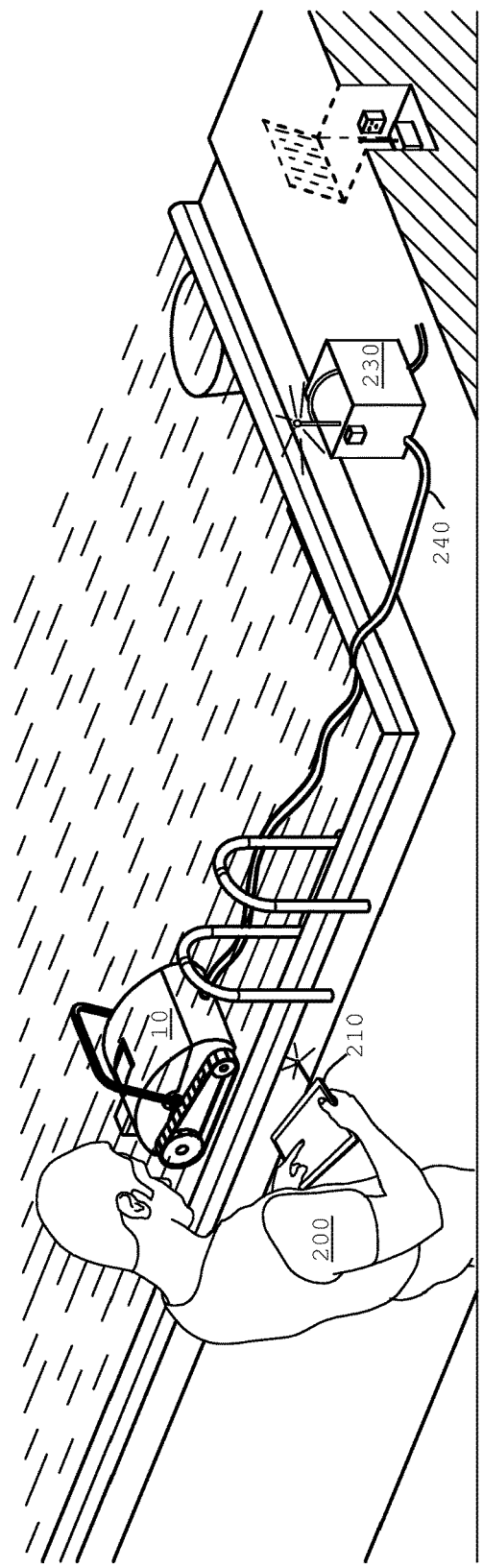
FIG. 3 illustrates a user or operator that operates a wireless control device, a pool cleaning robot, a power supply unit and a pool according to embodiments of the invention.

FIG. 3 illustrates user 200 that operates a mobile computer such as a tablet 210, a pool cleaning robot 10, a power supply unit 230 connected by cable 240 to the pool cleaning robot 10 whereby the power supply comprises a remote controlled wireless receiving/transmitting communication module that may convert data to a digital form, and a pool according to an embodiment of the invention. In another embodiment seen in FIG. 3, the communication module may be located underneath the pool deck in a precast in-ground recess whereby, a remote control wireless junction box and an antenna is powered by power supply 230 (230 A) that is positioned remotely from the pool side.

The pool cleaning robot 10 may not be connected to an external power supply unit. It may be powered by on-board batteries and a submerged docking station, may exit the pool in order to be charged by an external docking system, may be fed by pressurized fluid, and include a turbine to generate power, and the like.

Tablet 210 is merely a non-limiting example of the control unit. Tablet 210 may be wirelessly coupled to the pool cleaning robot and/or may communicate with an intermediary relay or a communication module that in turn communicates with the pool cleaning robot.

Figure 4:
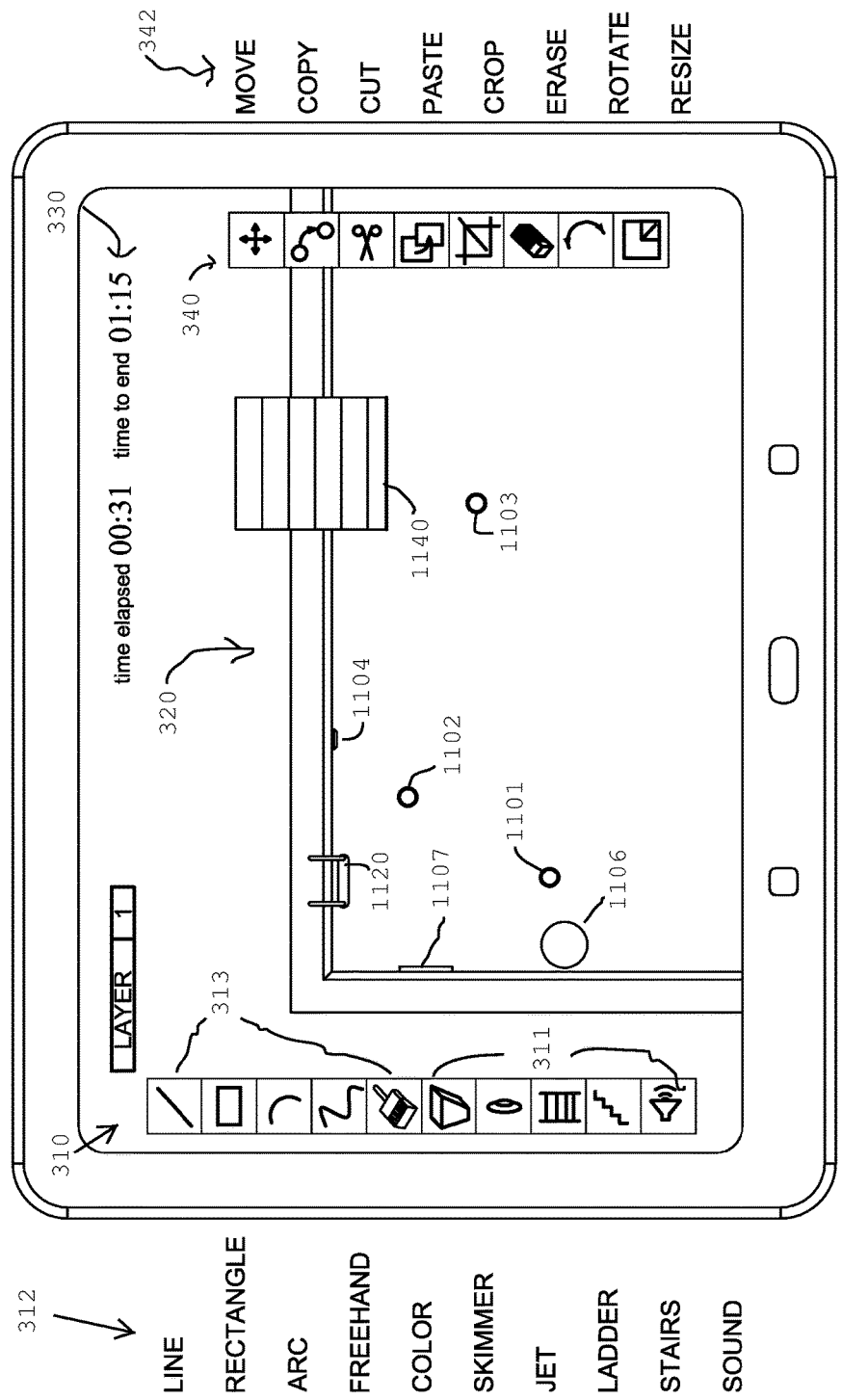
FIG. 4 illustrates screen shot of the control device, the touch screen shot illustrates a graphical representation of a part of the pool, a touch screen menu, with drawn-in pool obstacles, according to an embodiment of the invention.

FIG. 4 illustrates screen shot 300 of the mobile computer control device. The screen shot illustrates a graphical representation 320 of an entire pool or a part of the pool that was identified by the pool cleaner in its default OEM mode, with drawn-in pool obstacles 1101, 1102, 1103, 1104, 1106, 1107, 1120 and 1140 corresponding to obstacles 101, 102, 103, 104, 106, 107, 120 and 140 of FIG. 2 that can also be added or added by dragging and overridingly pasted in various locations of the depicted pool screen shot.

The screen shot also includes:
 a. A legend or iconographies and graphical illustrations 311 that provides a definition of the different graphical items that represent the obstacles.
 b. Control icons or iconographies and/or command action names 313 and 342 and 340 for controlling the editing of the image shown on the screen shot and/or for pool cleaning robot control purposes.
 c. Timing information clock 330 that may also indicate a time lapsed from a beginning of a certain operation of the pool cleaning robot (such as a cleaning session) and/or time remaining to the end of the certain operation.

Figure 5:
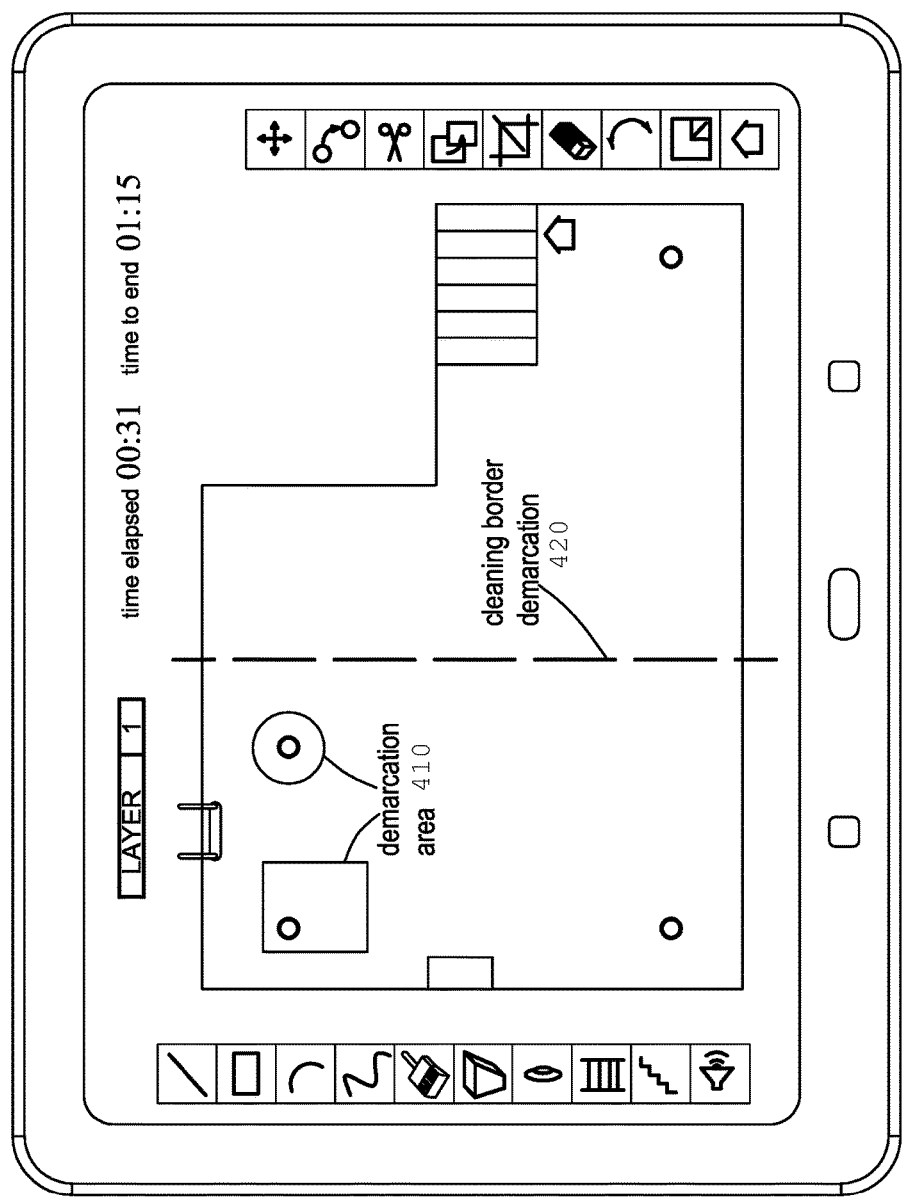
FIG. 5 illustrates a screen shot of the control device, the screen shot illustrates a graphical representation of a part of the pool, a virtual demarcation area line and a specific pinch to expand a virtual electronic geometrical form or forms around the target virtually demarcated zone according to an embodiment of the invention.

FIG. 5 illustrates a screen shot of the control device that includes iconographies and graphical command illustrations. The screen shot illustrates a graphical representation of a part of the pool, a virtual demarcation line 420 and, a specific pinch to expand a geometrical form around the wanted target demarcated cleaning zone 410 (may be a square or a rectangle or a circle)—both such virtual demarcation boundaries may be inputted and transmitted to the pool cleaner by the user according to an embodiment of the invention. The pool cleaning robot, once performing a cleaning session controlled by this screen shot, will not pass the virtual demarcation line 420 and will either scrub, sweep and vacuum cleaning zone 410 or stay out of said such areas/zones.

Such virtual demarcation areas may be electronically duplicated to two or more such areas within the virtual pool whereby the program may allow timing limits of the tenure within each demarcated area before moving onto the next area.

Alternatively, the demarcation command may mean that the pool cleaner should spend and focus its cleaning cycle tenure only within the boundaries of this said demarcated path, area or zone.

FIG. 5 also depicts the 'home' icon or end of cycle point that can be programmed by touching the touch screen.

Figure 6:
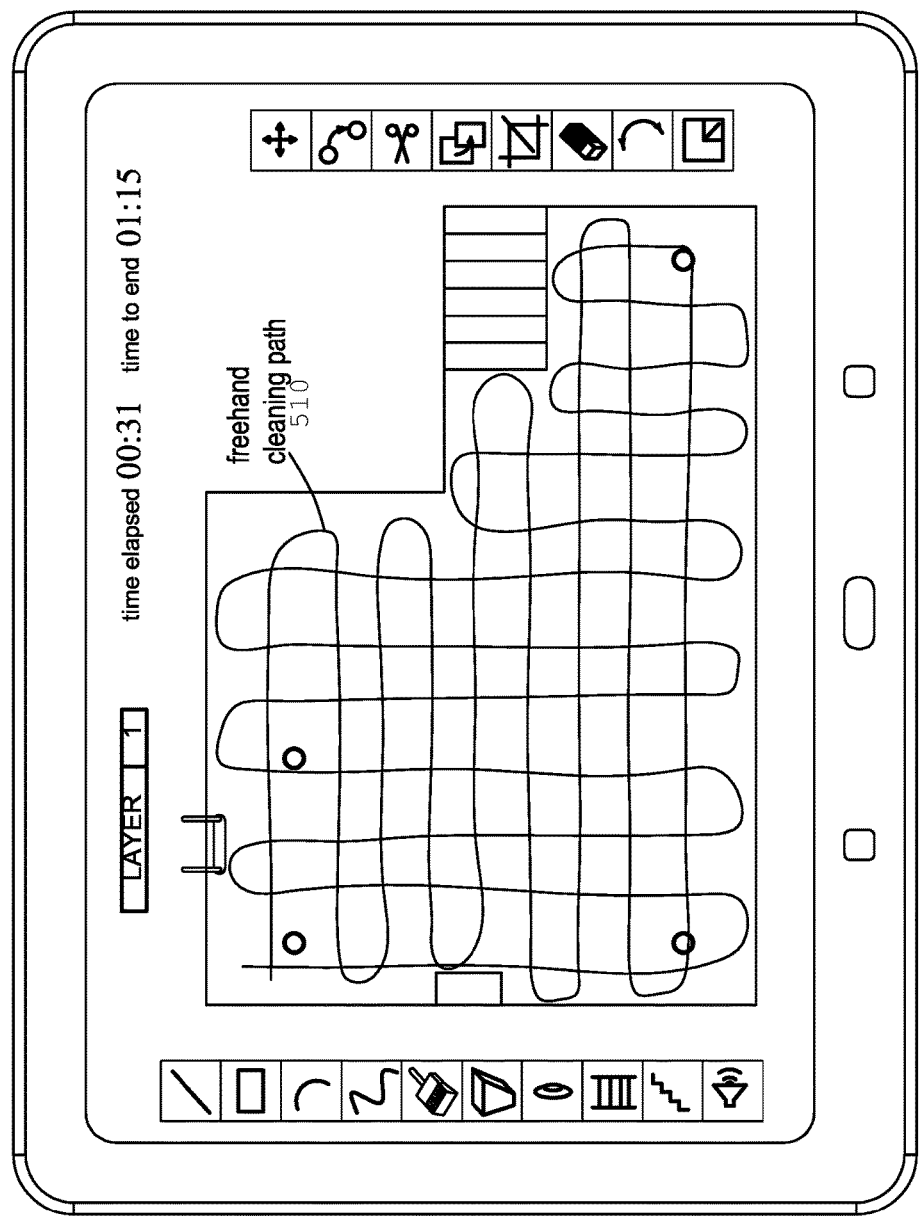
FIG. 6 illustrates a screen shot of the control device, the screen shot illustrates a graphical representation of a part of the pool, and a requested freehand cleaning path to be followed by the pool cleaning robot according to an embodiment of the invention.

FIG. 6 illustrates a screen shot of the control device, the screen shot illustrates a graphical representation of an entire pool or a part of the pool, and an overriding requested freehand cleaning demarcation path 510 drawn by the user to be programmed and followed by the pool cleaning robot according to an embodiment of the invention. Additionally to the freehand demarcation path drawing option, default virtual scanning demarcation paths may be pasted onto the pool area on the touch screen. For example, virtual zig-zag patterns, curves, snail paths, circles, repeat back and forth paths or trajectories and the like.

Figure 7:
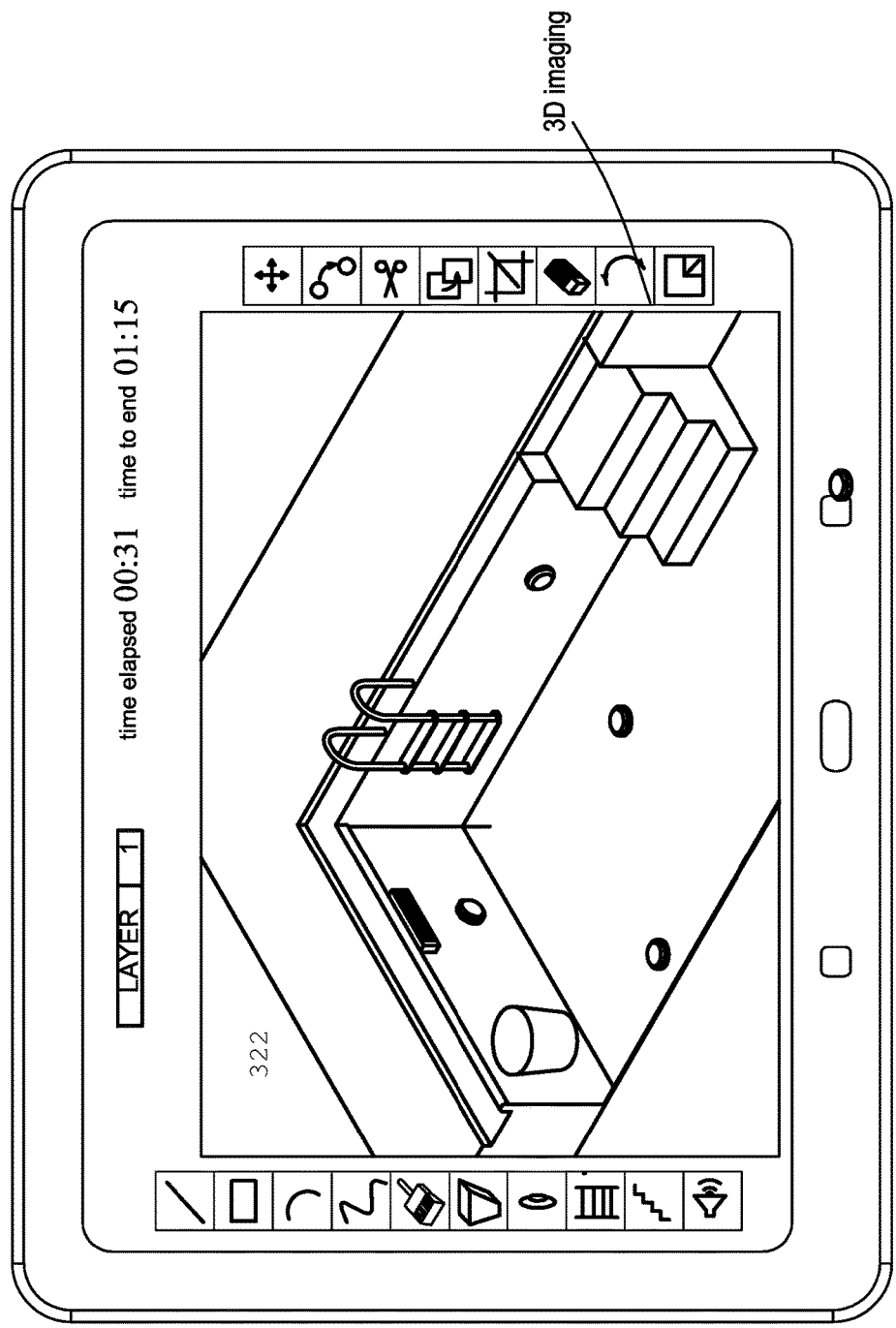
FIG. 7 illustrates a screen shot of the control device, the screen shot illustrates a graphical representation of a part of the pool which is three dimensional according to an embodiment of the invention.

FIG. 7 illustrates a screen shot of the control device; the screen shot illustrates a graphical representation 322 of a part of the pool which is three dimensional depiction according to an embodiment of the invention. The 3D depiction may be rotated or panned.

Figure 8:
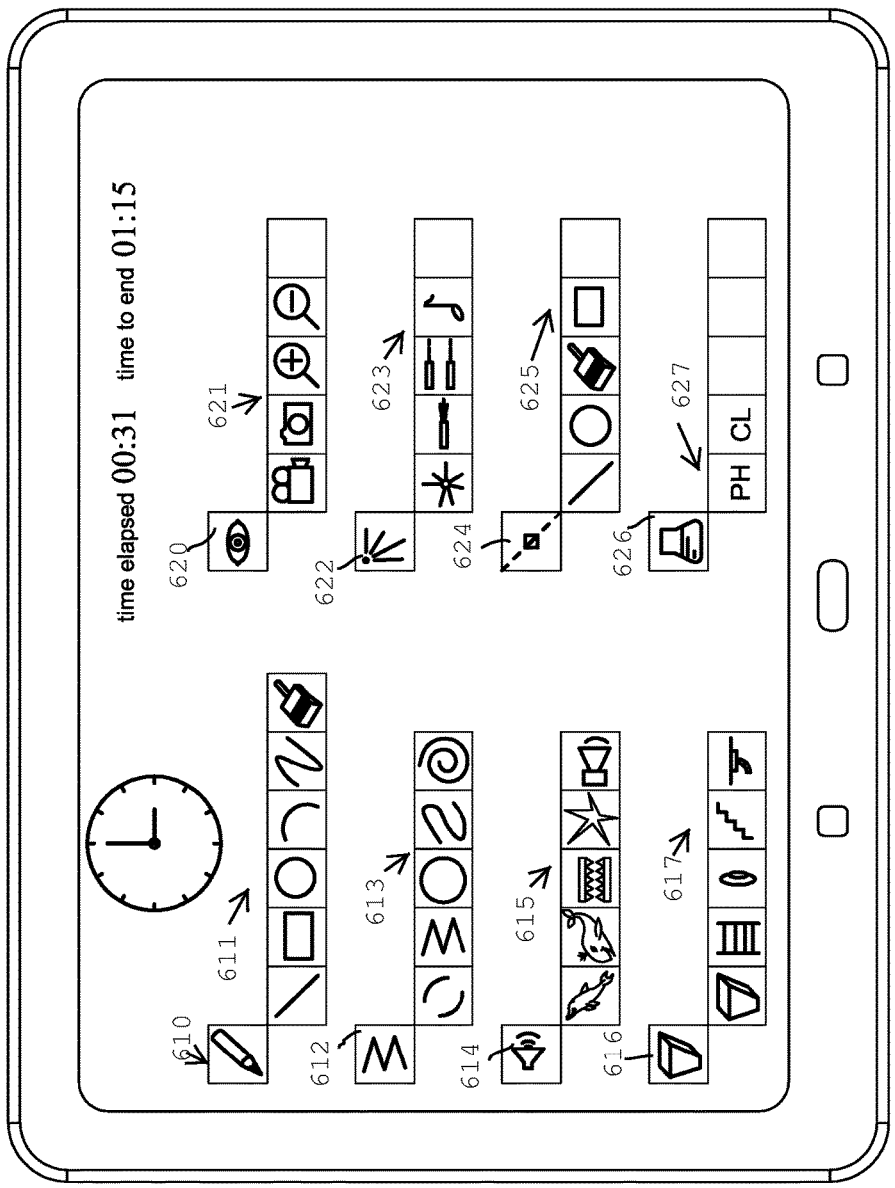
FIG. 8 illustrates a screen shot of the control device, the screen shot is a menu of the control device and includes exemplary sound toolbar and options, camera and video cam toolbar according to an embodiment of the invention.

FIG. 8 illustrates a screen shot of the mobile computer control device. The screen shot depicts menus and templates, iconographies and graphical command illustrations of the control device and includes sound toolbar and sound options according to an embodiment of the invention. New iconographies and graphical command illustrations may be downloaded from the OEM web site on demand. The screen shot includes:
 a. A drawing sub-menu 610 and various drawing icons 611 that belong to the drawing sub-menu 610.
 b. A pool scanning demarcation path or area drawing sub-menu 612 and various line drawing icons 613 templates that belong to the line drawing sub-menu 612 that may be dragged and pasted/positioned in the drawn-in pool.
 c. A sound sub-menu 614 and various sound template icons 615 that belong to the sound sub-menu 614. The sound icons may instruct the pool cleaning robot to cause generation of dolphin squeaks and whistles sounds, whale sounds, debris eating or biting sounds, wall or obstacle bumping sounds on the mobile computer control device that may also include a tablet vibration function (not shown), brushing friction sounds, control device voice activation option and the like.
 d. An obstacles constituents sub-menu 616 and various obstacle icons 617 templates that belong to the obstacles sub-menu 616 that may be dragged and pasted/positioned in the drawn-in pool.
 e. An image acquisition sub-menu 620 and various image acquisition icons 621 that belong to the image acquisition sub-menu 620. Stills, video, zoom in, zoom out, save to, send functions and the like.
 f. A laser or other lighting entertainment light show sub-menu 622 and various optional lighting show icons 623 that include connection light show to music played and using the music rhythm to activate the laser light show that belong to the sub-menu 622.
 g. A virtual demarcation sub-menu 624 and various drawing template icons and drawing tools 625 such as squares, path lines, circles and a painting brush that belong to the virtual demarcation sub-menu 624. Tools and templates may also be used from drawing sub menu 610 such as the freehand scanning pattern.
 h. Various options for a clock depiction including a timer option where the operator may pre-set the time when the pool is to be fully cleaned.

It is noted that the pool cleaning robot may transmit information to be depicted in a screen shot about readings 626 of sensors about pool constituents (for example water temperature read by a temperature sensor, water chemistry such as PH level, chlorine (CH) or any other chemistry reading 627, read by a water chemistry sensor, and the like) and information about the readings may be displayed by the control device.

Figure 9:
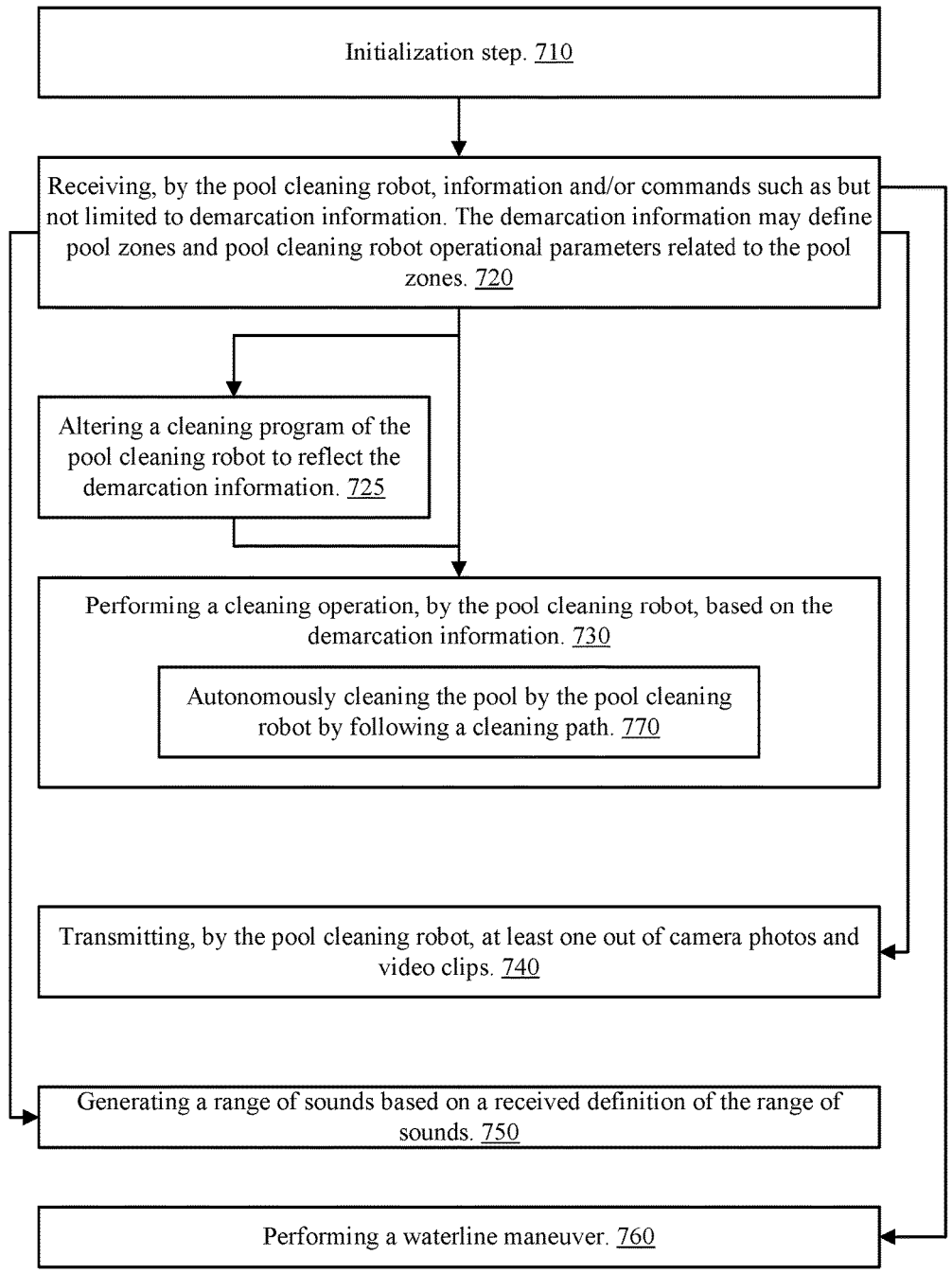
FIG. 9 illustrates a method according to an embodiment of the invention.

FIG. 9 illustrates method 700 according to an embodiment of the invention.

Method 700 may start by initialization step 710.

Step 710 may include at least one of the following:
 a. Generating information by a mobile computer that is under a control of the user and transmitting the information to the pool cleaning robot. The information may be demarcation information.
  b. Mapping the pool by the pool cleaning robot, using at least one sensor of the pool cleaning robot; and based on the mapping, generating by the pool cleaning robot a new cleaning program, or amending a cleaning program.

Under the control of the user means that the user may feed instructions/commands/information to the mobile computer.

The generating of the information may include at least one out of:
  a. Defining a cleaning path by the user of the mobile computer by a freehand drawn virtual cleaning demarcation path.
  b. Defining a pool cleaning by a geometrically drawn virtual cleaning path demarcation area.
  c. Interaction with a touch screen of the mobile computer.
  d. Drawing swipe or pinch to enlarge gestures on a touch screen of the mobile computer.
  e. Drawing pool constituents. The pool constituents may be represented by drawn-in iconographies and graphical illustrations.

Step 710 may be followed by step 720 of receiving, by the pool cleaning robot, information and/or commands such as but not limited to demarcation information. The demarcation information may define pool zones and pool cleaning robot operational parameters related to the pool zones.

Step 720 may be followed by step 730 of performing a cleaning operation, by the pool cleaning robot, based on the demarcation information.

The cleaning operations may include cleaning one or more of the pool zones and/or avoiding from cleaning one or more of the pool zones.

Step 720 may be followed by step 725 of altering or updating a cleaning program of the pool cleaning robot to reflect the demarcation information. Step 725 may be followed by step 730.

The pool zones may be defined by pool constituents.

The demarcation information may define a first pool zone that should not be cleaned by the pool cleaning robot and a second pool zone that should be cleaned by the pool cleaning robot and wherein the method may include avoiding from cleaning the first pool zone and focalized cleaning the second pool zone.

The demarcation information may define a first pool zone that should not be visited by the pool cleaning robot.

The demarcation information may define a cleaning path for the pool cleaning robot, wherein the cleaning path represents one or more of the pool zones.

The receiving of the demarcation information may include receiving the demarcation over a wireless link.

Step 720 may also include receiving, by the pool cleaning robot, visual illustrations and data pertaining to pool constituents.

Step 720 may include receiving commands relating to the creation/taking and transmission of at least one out of camera photos and video clips.

Step 720 may also be followed by step 740 of transmitting, by the pool cleaning robot, at least one out of camera photos and video clips.

Step 720 may include receiving by the mobile computer a definition of sounds to be generated by the pool cleaning robot.

Step 720 may be followed by step 750 of generating the range of sounds based on the received definition Step 720 may include receiving by the pool cleaning robot commands for performing a wall climbing or a waterline demarcation maneuver. During at least a part of the demarcated waterline maneuver the pool cleaning robot is positioned on the wall or at the waterline.

Step 720 may be followed by step 760 of performing the demarcated waterline maneuver.

Step 720 may include receiving, by the pool cleaning robot, cleaning path information that may define a demarcated cleaning path to be followed by the pool cleaning robot when the pool cleaning robot cleans a pool.

Step 725 may include updating a cleaning program of the pool cleaning robot, based on the cleaning path information.

Step 725 may be followed by step 770 of autonomously cleaning the pool by the pool cleaning robot by following the cleaning path. Step 770 may or may not be included in step 730.

It should be noted that each one of steps 740, 750 and 760 may follow step 725.

Figure 10:
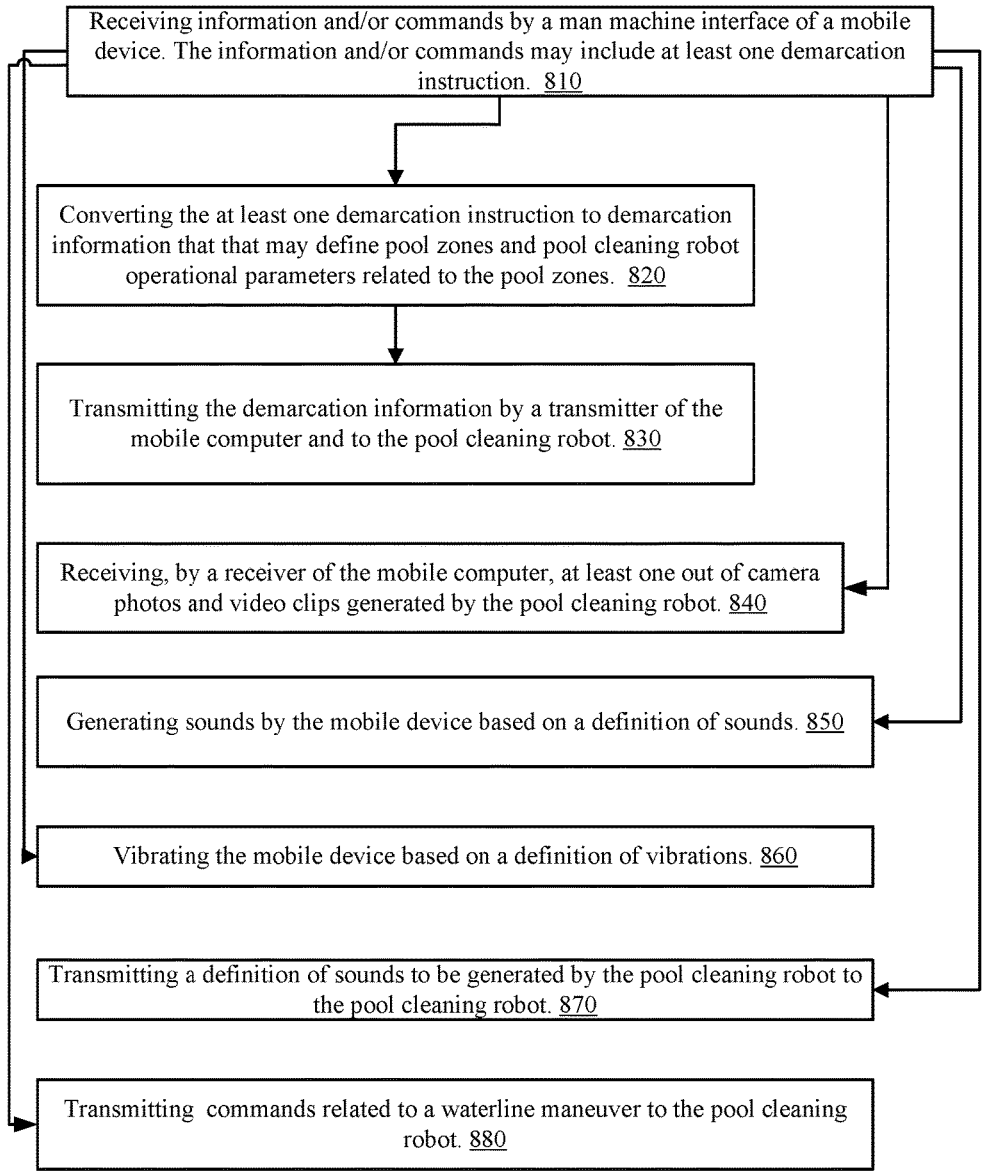
FIG. 10 illustrates a method according to an embodiment of the invention.

FIG. 10 illustrates method 800 according to an embodiment of the invention.

Method 800 may start by step 810 of receiving information and/or commands by a man machine interface of a mobile device.

Step 810 may include receiving at least one demarcation instruction. The at least one demarcation instruction may be, for example, the virtual demarcation line 420 of FIG. 5, a specific pinch to expand a geometrical form around the wanted target demarcated cleaning zone 410 of FIG. 5, and/or freehand cleaning path 510 of FIG. 6.

Step 820 may include converting the at least one demarcation instruction to demarcation information that that may define pool zones and pool cleaning robot operational parameters related to the pool zones. The conversion may include representing the at least one demarcation instruction to a format that is recognized by the pool cleaning robot. For example, translating the cleaning zone demarcation 420 to an instruction not clean (or even not to visit in) the pool zone that is located to the right of the cleaning zone demarcation 420 and to instructions for either scrubbing, sweeping and vacuum cleaning zone 410 or stay out of said such areas/zones.

Step 820 may be followed by step 830 of transmitting the demarcation information by a transmitter of the mobile computer and to the pool cleaning robot.

Step 810 may also include receiving commands for triggering a transmittal of at least one out of camera photos and video clips generated by the pool cleaning robot.

Step 810 may be followed by step 840 of receiving, by a receiver of the mobile computer, at least one out of camera photos and video clips generated by the pool cleaning robot.

Step 810 may include receiving by the man machine interface of the mobile computer a definition of sounds to be generated by the mobile computer. The sounds may include at least one out of a sound of a dolphin, a sound of a whale, squeaks and whistles. The sounds may include at least one out of a debris eating or biting sounds. The sounds may include at least one out of a wall or obstacle bumping sounds. The definition may include timing information about the time in which the sounds should be generated. The definition includes event trigger information that will define an event that will trigger the generation of the sounds. The event may be, for example, the emerging of the pool cleaning robot to the waterline or to any other predefined position, reaching a sidewall or an obstacle by the pool cleaning robot (the pool cleaning robot may send to the mobile computer information about the reaching to the predefined location, reaching the sidewall or an obstacle and the like).

Step 810 may be followed by step 850 of generating the sounds by the mobile device based on the definition.

Step 810 may include receiving definition of vibrations to be generated by the mobile computer.

Step 810 may be followed by step 860 of vibrating the mobile device based on the definition. Step 860 may include vibrating the mobile computer in synchronicity with the generating of the wall or obstacle bumping sounds.

Step 810 may include receiving a definition of sounds to be generated by the pool cleaning robot.

Step 810 may be followed by step 870 of transmitting the definition to the pool cleaning robot.

Step 810 may include receiving commands for performing a waterline maneuver by the pool cleaning robot.

Step 810 may be followed by step 880 of transmitting the commands related to the waterline maneuver to the pool cleaning robot.

Step 810 may include at least one out of:
 a. Receiving a freehand drawn virtual cleaning path.
 b. Receiving a geometrically drawn virtual cleaning path demarcation.
 c. Sensing drawing swipe gestures on the touch screen.
 d. Receiving information about pool constituents. The pool constituents may be represented by drawn-in iconographies and graphical illustrations.

Figure 11:
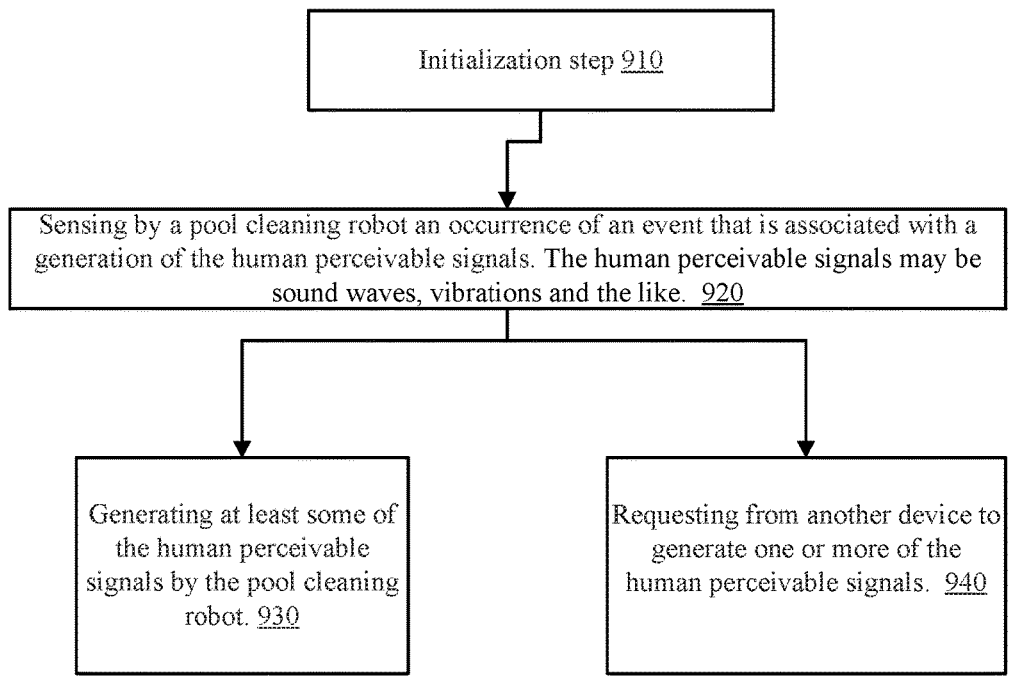
FIG. 11 illustrates a method according to an embodiment of the invention.

FIG. 11 illustrates method 900 according to an embodiment of the invention.

Method 900 may start by initialization step 910.

Initialization step 910 may be followed by step 920 of sensing by a pool cleaning robot an occurrence of an event that is associated with a generation of the human perceivable signals. The human perceivable signals may be sound waves, vibrations and the like.

The human perceivable signals may include at least one out of a sound of a dolphin, a sound of a whale, squeaks and whistles. The sounds may include at least one out of a debris eating or biting sounds. The sounds may include at least one out of a wall or obstacle bumping sounds.

Step 920 may be followed by at least one of steps 930 and 940. Both are executed by the pool cleaning robot.

Step 930 may include generating at least some of the human perceivable signals by the pool cleaning robot.

Step 940 may include requesting from another device to generate one or more of the human perceivable signals.

Any combination of steps 930 and 940 may be provided. For example—all the human perceivable signals may be generated by the pool cleaning robot, all the human perceivable signals may be generated by the other device, or some of the human perceivable signals by the pool cleaning robot and generating the one or more of the human perceivable signals by the other devices.

Step 910 may include receiving, by the pool cleaning robot, an association between the event and the generation of the human perceivable signals. The association defines which event will result in the generation of the human perceivable signals and which human perceivable signals should be generated.

It should be noted that the association may be programmed to the pool cleaning robot during the manufacturing process or during any point in time and that step 910 of receiving the association may update/replace or delete an older association.

The association may be received from a mobile device under a control of a user. For example—see sound sub-menu 614.

The mobile device or another device that differs from the mobile device may generate the human perceivable signals during step 940. The other device may be a stationary or not stationary speaker, an above water or underwater speaker, a vibration generator, and the like.

The event may be any event that is sensed by the pool cleaning robot. For example—climbing of the pool cleaning robot on a sidewall of the pool; reaching (contacting or being proximate such as 1-10 centimeters from) an obstacle by the pool cleaning robot; reaching, by the pool cleaning robot, a bump; reaching, by the pool cleaning robot, a waterline; a cleaning operation executed by the pool cleaning robot.

There may be provided a method that includes sensing by a sensor of the mobile computer an event (for example a certain inclination of the mobile device or any sensor of the mobile computer that senses an event that does not include feeding information by the user) and this sensing will trigger the mobile computer to instruct the pool cleaning robot to generate human perceivable signals (either by itself or in addition to human perceivable signals generated by the mobile computer).

There may be provided a method for operating a pool cleaning robot, the method may include receiving, by the pool cleaning robot, demarcation information that defines pool zones and pool cleaning robot operational parameters related to the pool zones; wherein the demarcation information may be generated by a mobile computer and under a control of a user; and performing a cleaning operation, by the pool cleaning robot, based on the demarcation information.

The receiving may be followed by altering a cleaning program of the pool cleaning robot to reflect the demarcation information.

The receiving of the demarcation information may be preceded by mapping the pool by the pool cleaning robot, using at least one sensor of the pool cleaning robot; and based on the mapping, generating by the pool cleaning robot a new cleaning program, or amending the cleaning program.

The method may include verifying, by the pool cleaning robot, locations of the pool zones based on locations of pool constituents.

The demarcation information defines a first pool zone that should not be cleaned by the pool cleaning robot and a second pool zone that should be cleaned by the pool cleaning robot and wherein the method may include avoiding from cleaning the first pool zone and focalized cleaning the second pool zone.

The second pool zone may include at least a portion of a sidewall of the pool.

The first pool zone may include at least a portion of a sidewall of the pool.

The demarcation information defines a first pool zone that should not be visited by the pool cleaning robot.

The first pool zone may include at least a portion of a sidewall of the pool.

The demarcation information defines a cleaning path for the pool cleaning robot, wherein the cleaning path represents one or more of the pool zones.

The cleaning path may be defined by a freehand drawn virtual cleaning path.

The pool cleaning path may be defined by a geometrically drawn virtual cleaning path demarcation.

The receiving of the demarcation information may be preceded by generating the demarcation information by interaction with a touch screen of the mobile computer.

The receiving of the demarcation information may be preceded by generating the demarcation information by drawing pinch to expand swipe gestures on a touch screen The receiving of the demarcation information may be preceded by generating the demarcation information by drawing pool constituents The pool constituents may be represented by drawn-in iconographies and graphical illustrations.

The pool graphical illustrations may be represented in three-dimensional depictions.

The receiving of the demarcation information may include receiving the demarcation over a wireless link.

The method may include receiving, by the pool cleaning robot, visual illustrations, and data pertaining to pool constituents.

The method may include transmitting, by the pool cleaning robot, at least one out of camera photos and video clips.

The transmitting of the at least one out of camera photos and video clips may be responsive to commands sent from the mobile computer.

The method may include receiving by the mobile computer a definition of sounds to be generated by the mobile computer.

The sounds may include at least one out of a sound of a dolphin, a sound of a whale, squeaks and whistles.

The sounds may include at least one out of a debris eating sounds, biting sounds and brushing friction sounds, The sounds may include at least one out of a wall or obstacle bumping sounds.

The method may include vibrating the mobile computer in synchronicity with the generating of the wall or obstacle bumping sounds.

The method may include receiving by the pool cleaning robot a definition of sounds to be generated by the pool cleaning robot.

The method may include receiving by the pool cleaning robot commands for performing waterline maneuver.

The method may include generating by the mobile computer predefined sounds in synchronism with the waterline maneuver.

There may be provided a method for operating a pool cleaning robot, the method may include receiving, by the pool cleaning robot, cleaning path information that defines a cleaning path to be followed by the pool cleaning robot when the pool cleaning robot cleans a pool; wherein the cleaning path information may be generated by a mobile computer and under a control of a user; updating a cleaning program of the pool cleaning robot, based on the cleaning path information; and autonomously cleaning the pool by the pool cleaning robot by following the cleaning path.

There may be provided a method for controlling a pool cleaning robot, the method may include receiving, by a man machine interface of a mobile computer, at least one demarcation instruction; converting the at least one demarcation instruction to demarcation information that defines pool zones and pool cleaning robot operational parameters related to the pool zones; and transmitting the demarcation information by a transmitter of the mobile computer and to the pool cleaning robot.

The method may include receiving, by a receiver of the mobile computer, at least one out of camera photos and video clips generated by the pool cleaning robot.

The receiving of the at least one out of camera photos and video clips may be triggered by commands that may be sent to the pool cleaning robot from the mobile computer.

The method may include receiving by the man machine interface of the mobile computer a definition of sounds to be generated by the mobile computer.

The sounds may include at least one out of a sound of a dolphin, a sound of a whale, squeaks and whistles.

The sounds may include at least one out of a debris eating or biting sounds

The sounds may include at least one out of a wall or obstacle bumping sounds.

The method may include vibrating the mobile computer in synchronicity with the generating of the wall or obstacle bumping sounds.

The method may include sending to the pool cleaning robot a definition of sounds to be generated by the pool cleaning robot.

The method may include sending to the pool cleaning robot commands for performing a waterline maneuver.

The method may include generating by the mobile computer predefined sounds in synchronism with the waterline maneuver.

The demarcation information defines a cleaning path for the pool cleaning robot, wherein the cleaning path represents one or more of the pool zones.

The cleaning path may be defined by a freehand drawn virtual cleaning path.

The pool cleaning path may be defined by a geometrically drawn virtual cleaning path demarcation.

The man machine interface may be a touch screen.

The receiving of the at least one demarcation instruction may include sensing drawing pinch to expand swipe gestures on the touch screen.

The receiving of the at least one demarcation instruction may include receiving information about pool constituents.

The pool constituents may be represented by drawn-in iconographies and graphical illustrations.

The pool graphical illustrations may be represented in three-dimensional depictions.

There may be provided a pool cleaning robot that may include a housing; an outlet for outputting filtered fluid; an inlet for receiving non-filtered fluid; a controller; a filtering unit; a propulsion system; one or more sensors; and a receiver; wherein the receiver may be configured to receive demarcation information that defines pool zones and pool cleaning robot operational parameters related to the pool zones; wherein the demarcation information may be generated by a mobile computer and under a control of a user; and wherein the controller may be configured to control a cleaning operation of the pool cleaning robot, based on the demarcation information; wherein the cleaning operation may include passing the non-filtered fluid through the filtering unit to provide the filtered fluid while moving the pool cleaning robot by the propagation system.

The pool cleaning robot may be configured to execute at least one of the following:
   a. Alter a cleaning program of the pool cleaning robot to reflect the demarcation information.
   b. Map the pool using at least one sensor of the pool cleaning robot.
   c. Based on the mapping, generating a new cleaning program, or amending the cleaning program.
   d. Verify locations of the pool zones based on locations of pool constituents.
   e. Avoid from cleaning a first pool zone and focalized cleaning a second pool zone.
   f. Avoid from visiting a certain pool zone.
   g. Following a cleaning path defined by the demarcation information.
   h. Receive the demarcation information over any type of link such as a wireless link.
   i. Receive visual illustrations and data pertaining to pool constituents.

j. Transmit at least one out of camera photos and video clips.
k. Receive commands that trigger the transmission of the at least one out of camera photos and video clips.
l. Receive a definition of sounds to be generated by the pool cleaning robot.
m. Receive commands for performing waterline maneuver.
n. Executing a waterline maneuver.

There may be provided a method for operating a pool cleaning robot, the method may include receiving, by the pool cleaning robot, cleaning path information that defines a cleaning path to be followed by the pool cleaning robot when the pool cleaning robot cleans a pool; wherein the cleaning path information may be generated by a mobile computer and under a control of a user; updating a cleaning program of the pool cleaning robot, based on the cleaning path information; and autonomously cleaning the pool by the pool cleaning robot by following the cleaning path.

There may be provided a method for controlling a pool cleaning robot, the method may include receiving, by a man machine interface of a mobile computer, at least one demarcation instruction; converting the at least one demarcation instruction to demarcation information that defines pool zones and pool cleaning robot operational parameters related to the pool zones; and transmitting the demarcation information by a transmitter of the mobile computer and to the pool cleaning robot.

The method may include receiving, by a receiver of the mobile computer, at least one out of camera photos and video clips generated by the pool cleaning robot.

The receiving of the at least one out of camera photos and video clips may be triggered by commands that may be sent to the pool cleaning robot from the mobile computer.

The method may include receiving by the man machine interface of the mobile computer a definition of sounds to be generated by the mobile computer.

The sounds may include at least one out of a sound of a dolphin, a sound of a whale, squeaks and whistles.

The sounds may include at least one out of a debris eating or biting sounds

The sounds may include at least one out of a wall or obstacle bumping sounds.

The method may include vibrating the mobile computer in synchronicity with the generating of the wall or obstacle bumping sounds.

The method may include sending to the pool cleaning robot a definition of sounds to be generated by the pool cleaning robot.

The method may include sending to the pool cleaning robot commands for performing a waterline maneuver.

The method may include generating by the mobile computer predefined sounds in synchronism with the waterline maneuver.

The demarcation information may define a cleaning path for the pool cleaning robot, wherein the cleaning path represents one or more of the pool zones.

The cleaning path may be defined by a freehand drawn virtual cleaning path.

The pool cleaning path may be defined by a geometrically drawn virtual cleaning path demarcation.

The man machine interface may be a touch screen.

The receiving of the at least one demarcation instruction may include sensing drawing pinch to expand swipe gestures on the touch screen.

The receiving of the at least one demarcation instruction may include receiving information about pool constituents.

The pool constituents may be represented by drawn-in iconographies and graphical illustrations.

The pool graphical illustrations may be represented in three-dimensional depictions.

There may be provided a non-transitory computer readable medium that stores instructions that once executed by a pool cleaning robot, causes the pool cleaning robot to perform the steps of receiving demarcation information that defines pool zones and pool cleaning robot operational parameters related to the pool zones; wherein the demarcation information may be generated by a mobile computer and under a control of a user; and performing a cleaning operation based on the demarcation information.

There may be provided a non-transitory computer readable medium that stores instructions that once executed by a pool cleaning robot, causes the pool cleaning robot to perform the steps of receiving cleaning path information that defines a cleaning path to be followed by the pool cleaning robot when the pool cleaning robot cleans a pool; wherein the cleaning path information may be generated by a mobile computer and under a control of a user; updating a cleaning program of the pool cleaning robot, based on the cleaning path information; and autonomously cleaning the pool by the pool cleaning robot by following the cleaning path.

There may be provided a non-transitory computer readable medium that stores instructions that once executed by a mobile computer, causes the mobile computer to perform the steps of receiving at least one demarcation instruction; converting the at least one demarcation instruction to demarcation information that that defines pool zones and pool cleaning robot operational parameters related to the pool zones; and transmitting the demarcation information to the pool cleaning robot.

There may be provided a method for generating human perceivable signals, the method may include sensing by a pool cleaning robot an occurrence of an event that may be associated with a generation of the human perceivable signals; and executing by the pool cleaning robot and based on the sensing at least one out of generating at least some of the human perceivable signals by the pool cleaning robot; and requesting from another device to generate one or more of the human perceivable signals.

The method may include receiving, by the pool cleaning robot, an association between the event and the generation of the human perceivable signals.

The method may include receiving the association from a mobile device under a control of a user.

The other device may be the mobile device.

The other device differs from the mobile device.

The method may include generating all the human perceivable signals by the pool cleaning robot.

The method may include generating all the human perceivable signals by the other device.

The method may include generating some of the human perceivable signals by the pool cleaning robot and generating the one or more of the human perceivable signals by the other devices.

The event may be a climbing of the pool cleaning robot on a sidewall of the pool.

The event may be reaching, by the pool cleaning robot, an obstacle.

The event may be reaching, by the pool cleaning robot, a bump.

The event may be reaching, by the pool cleaning robot, a waterline.

The event may be a cleaning operation executed by the pool cleaning robot.

The human perceivable signals may include vibrations.

The human perceivable signals may include sound signals.

The human perceivable signals may include sounds of at least one out of a sound of a dolphin, a sound of a whale, squeaks, and whistles.

The human perceivable signals may include sounds of at least one out of a debris eating sounds, biting sounds and brushing friction sounds.

There may be provided a non-transitory computer readable medium that stores instructions that once executed by a pool cleaning robot, causes the pool cleaning robot to perform the steps of sensing by a pool cleaning robot an occurrence of an event that may be associated with a generation of the human perceivable signals; and executing by the pool cleaning robot and based on the sensing at least one out of generating at least some of the human perceivable signals by the pool cleaning robot; and requesting from another device to generate one or more of the human perceivable signals.

There may be provided a pool cleaning robot that comprises at least one sensor for sensing an occurrence of an event that may be associated with a generation of the human perceivable signals; and at least one of a transmitter and a human perceivable signals generator (such as one or more speaker or other sound generators). The human perceivable signals generator may be configured to generate, based on the sensing, at least some of the human perceivable signals. The transmitter is configured to transmit a request, based on the sensing, for another device to generate one or more of the human perceivable signals.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for operating a pool cleaning robot, the method comprises:
   receiving, by the pool cleaning robot, demarcation information that defines pool zones and pool cleaning robot operational parameters related to the pool zones; wherein the demarcation information is generated by a mobile computer and under a control of a user; and
   performing a cleaning operation, by the pool cleaning robot, based on the demarcation information; wherein at least one of the following is true:
   the receiving is followed by altering a cleaning program of the pool cleaning robot to reflect the demarcation information; and wherein the receiving of the demarcation information is preceded by mapping the pool by the pool cleaning robot, using at least one sensor of the pool cleaning robot; and based on the mapping, generating by the pool cleaning robot a new cleaning program or amending the cleaning program;
   the method comprises verifying, by the pool cleaning robot, locations of the pool zones based on locations of pool constituents;
   the demarcation information defines a first pool zone that should not be cleaned by the pool cleaning robot and a second pool zone that should be cleaned by the pool cleaning robot and wherein the method comprises avoiding from cleaning the first pool zone and focalized cleaning the second pool zone; and wherein the second pool zone comprises at least a portion of a sidewall of the pool; and
   the demarcation information defines the first pool zone that should not be cleaned by the pool cleaning robot and the second pool zone that should be cleaned by the pool cleaning robot and wherein the method comprises avoiding from cleaning the first pool zone and focalized cleaning the second pool zone; and wherein the first pool zone comprises the at least portion of the sidewall of the pool.

2. The method according to claim 1 wherein the receiving is followed by altering the cleaning program of the pool cleaning robot to reflect the demarcation information.

3. The method according to claim 2 wherein the receiving of the demarcation information is preceded by:
   mapping the pool by the pool cleaning robot, using the at least one sensor of the pool cleaning robot; and
   based on the mapping, generating by the pool cleaning robot the new cleaning program or amending the cleaning program.

4. The method according to claim 1 comprising verifying, by the pool cleaning robot, locations of the pool zones based on locations of pool constituents.

5. The method according to claim 1 wherein the demarcation information defines the first pool zone that should not be cleaned by the pool cleaning robot and the second pool zone that should be cleaned by the pool cleaning robot and wherein the method comprises avoiding from cleaning the first pool, zone and focalized cleaning the second pool zone.

6. The method according to claim 5 wherein the second pool zone comprises the at least portion of the sidewall of the pool.

7. The method according to claim 5 wherein the first pool zone comprises the at least portion of the sidewall of the pool.

8. The method according to claim 1 wherein the demarcation information defines a first pool zone that should not be visited by the pool cleaning robot.

9. The method according to claim 8 wherein the first pool zone comprises the at least portion of the sidewall of the pool.

10. The method according to claim 1 wherein the demarcation information defines a cleaning path for the pool cleaning robot, wherein the cleaning path represents one or more of the pool zones.

11. The method according to claim 10 wherein the cleaning path is defined by a freehand drawn virtual cleaning path.

12. The method according to claim 11 wherein the pool cleaning path is defined by a geometrically drawn virtual cleaning path demarcation.

13. The method according to claim 1 wherein the receiving of the demarcation information is preceded by generating the demarcation information by interaction with a touch screen of the mobile computer.

14. The method according to claim 1 wherein the receiving of the demarcation information is preceded by generating the demarcation information by drawing pinch to expand swipe gestures on a touch screen.

15. The method according to claim 1 wherein the receiving of the demarcation information comprises receiving the demarcation over a wireless link.

16. The method according to claim 1 further comprises receiving, by the pool cleaning robot, visual illustrations and data pertaining to pool constituents.

17. The method according to claim 1 further comprising transmitting, by the pool cleaning robot, at least one out of camera photos and video clips.

18. The method according to claim 17 wherein the transmitting of the at least one out of camera photos and video clips are responsive to commands sent from the mobile computer.

19. The method according to claim 1 comprising receiving by the mobile computer a definition of sounds to be generated by the mobile computer.

20. The method according to claim 19 wherein the sounds comprise at least one out of a sound of a dolphin, a sound of a whale, squeaks and whistles.

21. The method according to claim 19 wherein the sounds comprise at least one out of a debris eating sounds, biting sounds and brushing friction sounds.

22. The method according to claim 19 wherein the sounds comprise at least one out of a wall or obstacle bumping sounds.

23. The method according to claim 22 further comprising vibrating the mobile computer in synchronicity with the generating of the wall or obstacle bumping sounds.

24. The method according to claim 1 comprising receiving by the pool cleaning robot a definition of sounds to be generated by the pool cleaning robot.

25. The method according to claim 1 comprising receiving by the pool cleaning robot commands for performing waterline maneuver.

26. The method according to claim 25 comprising generating by the mobile computer predefined sounds in synchronism with the waterline maneuver.

27. A method for operating a pool cleaning robot, the method comprises:
- receiving, by the pool cleaning robot, demarcation information that defines pool zones and pool cleaning robot operational parameters related to the pool zones; wherein the demarcation information is generated by a mobile computer and under a control of a user; and,
- performing a cleaning operation, by the pool cleaning robot, based on the demarcation information; wherein at least one of the following is true:
- the receiving of the demarcation information is preceded by generating the demarcation information by drawing pool constituents;
- the method comprises receiving, by the pool cleaning robot, visual illustrations and data pertaining to pool constituents; and
- the method comprises transmitting, by the pool cleaning robot, at least one out of camera photos and video clips.

28. The method according to claim 27 wherein pool constituents are represented by drawn-in iconographies and graphical illustrations.

29. The method according to claim 28 wherein pool graphical illustrations are represented in three-dimensional depictions.

30. A pool cleaning robot, comprising:
- a housing;
- an outlet for outputting filtered fluid;
- an inlet for receiving non-filtered fluid;
- a controller;
- a filtering unit;
- a propulsion system;
- one or more sensors; and
- a receiver;
- wherein the receiver is configured to receive demarcation information that defines pool zones and pool cleaning robot operational parameters related to the pool zones; wherein the demarcation information is generated by a mobile computer and under a control of a user; and
- wherein the controller is configured to control a cleaning operation of the pool cleaning robot, based on the demarcation information;
- wherein the cleaning operation comprises passing the non-filtered fluid through the filtering unit to provide the filtered fluid while moving the pool cleaning robot by the propagation system.

31. A method for operating a pool cleaning robot, the method comprises: receiving, by the pool cleaning robot, demarcation information that defines pool zones and pool cleaning robot operational parameters related to the pool zones; wherein the demarcation information is generated by a mobile computer and under a control of a user; and performing a cleaning operation, by the pool cleaning robot, based on the demarcation information; wherein at least one of the following is true:
- the demarcation information defines a cleaning path for the pool cleaning robot, wherein the cleaning path represents one or more of the pool zones; and wherein the cleaning path is defined by a freehand drawn virtual cleaning path;
- the receiving of the demarcation information is preceded by generating the demarcation information by interaction with a touch screen of the mobile computer; and
- the receiving of the demarcation information is preceded by generating the demarcation information by drawing pinch to expand swipe gestures on a touch semen.

32. A method for operating a pool cleaning robot, the method comprises: receiving, by the pool cleaning robot, demarcation information that defines pool zones and pool cleaning robot operational parameters related to the pool zones; wherein the demarcation information is generated by a mobile computer and under a control of a user; and performing a cleaning operation, by the pool cleaning robot, based on the demarcation information; wherein at least one of the following is true:
- the method comprises receiving by the mobile computer a definition of sounds to be generated by the mobile computer; and
- the method comprises receiving by the pool cleaning robot commands for performing waterline maneuver.

* * * * *